United States Patent
Kim et al.

(10) Patent No.: US 7,617,836 B2
(45) Date of Patent: Nov. 17, 2009

(54) SYSTEM AND METHOD FOR SUPPLYING FUNCTIONAL WATER

(75) Inventors: Ju-Won Kim, ChonAn-shi (KR); Doo-Keun An, ChonAn (KR); Kwang-Il Choi, ChonAn-shi (KR); Pyong-Soon Jung, ChonAn-shi (KR); Yong-Nam Choi, ChonAn-shi (KR); Jeong-Yong Bae, ChonAn-shi (KR)

(73) Assignee: Semes Co., Ltd., ChungCheongNam-do (KR)

( * ) Notice: Subject to any disclaimer, the term of this patent is extended or adjusted under 35 U.S.C. 154(b) by 402 days.

(21) Appl. No.: 11/377,679

(22) Filed: Mar. 17, 2006

(65) Prior Publication Data

US 2006/0207777 A1    Sep. 21, 2006

(30) Foreign Application Priority Data

| Mar. 18, 2005 | (KR) | ................. 10-2005-0022601 |
| Nov. 22, 2005 | (KR) | ................. 10-2005-0111854 |
| Nov. 23, 2005 | (KR) | ................. 10-2005-0112503 |

(51) Int. Cl.
*G05D 11/08* (2006.01)

(52) U.S. Cl. ................................. 137/93; 137/2; 137/3

(58) Field of Classification Search ............. 137/82, 137/93, 118.01, 118.02, 212, 5, 3; 210/739
See application file for complete search history.

(56) References Cited

U.S. PATENT DOCUMENTS

| 5,522,660 A * | 6/1996 | O'Dougherty et al. ...... 366/136 |
| 5,674,410 A * | 10/1997 | Nakajima et al. ............. 216/92 |
| 6,200,414 B1 * | 3/2001 | Hwang et al. .......... 156/345.18 |
| 6,482,325 B1 * | 11/2002 | Corlett et al. ................ 210/662 |

(Continued)

FOREIGN PATENT DOCUMENTS

JP    10-335302    12/1998

(Continued)

OTHER PUBLICATIONS

Office Action for corresponding Korean Application No. 10-2005-0022601 dated Mar. 28, 2006 (and English language translation).

(Continued)

*Primary Examiner*—Stephen Hepperle
(74) *Attorney, Agent, or Firm*—Harness, Dickey & Pierce, P.L.C.

(57) ABSTRACT

A supply system for supplying a functional water to a process unit which treats a substrate using the functional water is provided. In the system, the functional water generated in the functional water generator is supplied to a distributor through a functional water supply pipe. Thereafter, the functional water is supplied to the process unit while the process unit performs a process, and the functional water is returned to the functional water generator through a functional water returning pipe while the process unit does not perform a process. A buffer tank is installed in the functional water supply pipe and the concentration of the functional water is measured in a circulation line connected with the buffer tank. When the measured concentration of the functional water goes out of a set concentration range, the functional water is returned to the functional water generator through functional water returning pipe.

18 Claims, 7 Drawing Sheets

U.S. PATENT DOCUMENTS

| | | | |
|---|---|---|---|
| 6,796,703 B2 * | 9/2004 | Lemke | 366/152.4 |
| 6,955,764 B2 * | 10/2005 | Kobayashi | 210/739 |
| 2004/0012104 A1 * | 1/2004 | Ozawa et al. | 261/122.1 |
| 2004/0177655 A1 * | 9/2004 | Kodera et al. | 68/19 |
| 2004/0245182 A1 * | 12/2004 | Appleford et al. | 210/739 |
| 2005/0056313 A1 * | 3/2005 | Hagen et al. | 137/3 |
| 2005/0093182 A1 * | 5/2005 | Morita et al. | 261/26 |

FOREIGN PATENT DOCUMENTS

| | | |
|---|---|---|
| JP | 2000-037671 | 2/2000 |
| JP | 2000-037695 | 2/2000 |
| JP | 2002-093769 | 3/2002 |
| JP | 2003-290729 | 10/2003 |
| KR | 1994-0020502 | 9/1994 |
| KR | 0151238 | 12/1998 |
| KR | 10-2003-0086659 A | 11/2003 |
| KR | 10-2003-0095365 A | 12/2003 |
| KR | 10-2006-0018422 A | 3/2006 |
| TW | 200304165 | 9/2003 |
| WO | WO 03/091815 | 11/2003 |

OTHER PUBLICATIONS

Office Action dated Sep. 4, 2007 for corresponding Japanese Application No. 2006-071653.

Office Action for corresponding Korean Application No. 10-2005-0111854 dated Aug. 10, 2006 and English translation thereof.

Taiwanese Office Action and English translation dated Aug. 24, 2009.

\* cited by examiner

Fig. 1

(Related Art)

SYSTEM AND METHOD FOR SUPPLYING FUNCTIONAL WATER

PRIORITY STATEMENT

This application claims benefit of priority under 35 USC § 119 from Korean Patent Application Nos. 10-2005-0022601, 10-2005-0111854, and 10-2005-00112503, filed on Mar. 18, 2005, Nov. 22, 2005, and Nov. 23, 2005, respectively, in the Korean Intellectual Property Office, the contents of each of which is incorporated herein by reference in its entirety.

BACKGROUND OF THE INVENTION

1. Field of the Invention

The present invention relates to apparatus and method of fabricating a substrate, and more particularly, to system and method for supplying functional water to a substrate cleaning apparatus.

2. Description of the Related Art

During a variety of process steps for fabricating an integrated circuit using a semiconductor substrate, impurities, such as residual chemicals, small particles, contaminants and the like are generated. To remove these impurities, a process step of cleaning the semiconductor substrate is required. In particular, it is very important to remove fine contaminants attached on a surface of the semiconductor substrate in fabricating a highly integrated circuit.

Figure 1:
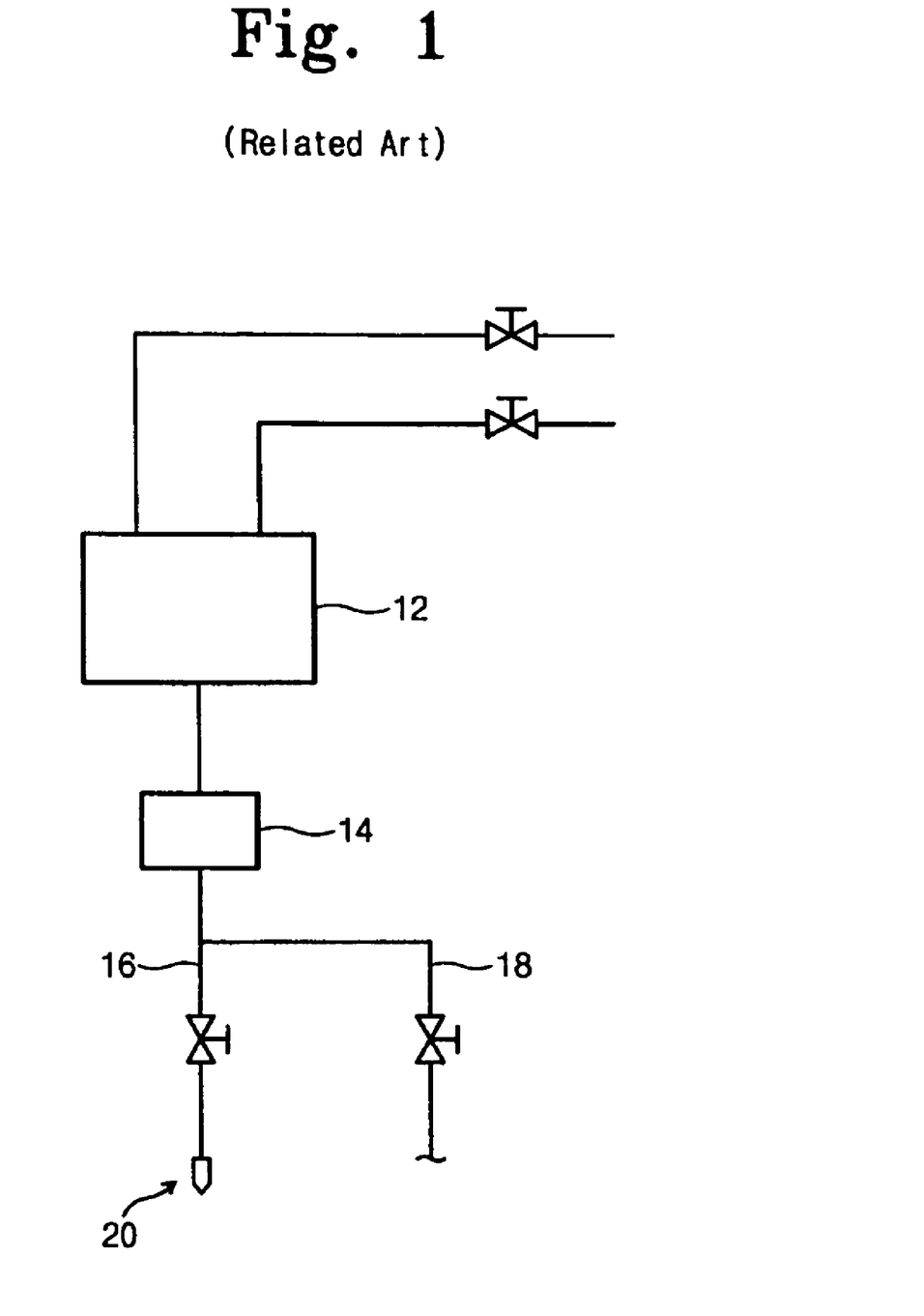
FIG. 1 is a view schematically showing a functional water supply system according to an example of the related art.

Recently, a method of cleaning the substrate using a functional water, such as hydrogen water, oxygen water or ozone water is used. FIG. 1 is a view schematically showing a functional water supply system generally used. Referring to FIG. 1, a functional water generator 12 generates a functional water by contacting a gas with a deionized water, and directly supplies the generated functional water to a nozzle 20 in a process unit through a supply pipe 16. While the process unit is in non-operation state, the functional water is discharged to an outside through a drainage pipe 18, so that the functional water is wasted.

Also, a concentration meter 14 for measuring concentration of a gas dissolved in the functional water is disposed adjacent to the functional water generator 12. The concentration meter 14 allows the functional water to be discharged until the concentration of the gas dissolved in the functional water reaches a set concentration range, and it allows the functional water to be supplied to the system when the concentration of the gas dissolved in the functional water maintains the set concentration range. Thus, since the related art functional water supply system discharges the functional water to an outside until the concentration of the gas dissolved in the functional water reaches the set concentration range, it too much wastes the functional water. Also, since the concentration of the gas is measured at a position adjacent to the functional water generator 12, the measured concentration may be higher than an actual gas concentration due to a residual gas which is not completely dissolved, so that a process failure may be caused.

SUMMARY OF THE INVENTION

Exemplary embodiments of the present invention provide system and method for supplying a functional water that can minimize waste of the functional water.

Also, exemplary embodiments of the present invention provide system and method for supplying a functional water that can exactly measure the concentration of a gas dissolved in the functional water and supply the functional water having a set concentration range to a process unit.

Embodiments of the present invention provide a supply system for supplying a functional water to a process unit which treats a substrate using the functional water. The system includes: a functional water generator generating the functional water; a functional water supply pipe supplying the functional water generated in the functional water generator to the process unit; a buffer tank connected with the functional supply pipe, for storing the functional water generated in the functional water generator; a concentration meter measuring the concentration of a gas dissolved in the functional water received in the buffer tank; and a functional water returning pipe returning the functional water in the buffer tank to the functional water generator when the concentration of the gas dissolved in the functional water received in the buffer tank goes out of a set concentration range.

In some embodiments, the system further includes: a distributor for distributing the functional water from the functional water supply pipe to the process unit; and a functional water recovery pipe recovering the functional water, which is not distributed to the process unit from the distributor, to the functional water generator.

In another embodiments, the system further includes a circulation pipe circulating the functional water in the buffer tank, wherein the concentration meter is installed on the circulation pipe. The functional water may include at least one selected from the group consisting of ozone water, oxygen water and hydrogen water.

In further embodiments, the functional water generator includes: a liquid supply part; a gas supply part; an injector for dissolving a gas in a liquid, the liquid is supplied from the liquid supply part and the gas is supplied from the supply part; and a contactor for enhancing the solubility of the gas in the liquid after receving the functional water discharged from the injector.

In other embodiments, the gas supply part includes a plurality of gas supply pipes connected with the injector so as to supply different kinds of gases to the injector, a valve is installed on each of the plurality of gas supply pipes, wherein the functional water supply system further includes a controller for controlling the valve installed on each of the plurality of gas supply pipes such that a selected gas is supplied to the injector.

In further embodiments, the injector is designed in a shape that allows the gas to be dissolved in the liquid by a venturi effect.

In yet other embodiments, the contactor includes: a body having an inlet and an outlet; and a plurality of diaphragms installed in the body and having a plurality of fine through holes, whereby while the functional water is dispersed and moved through the through holes of the diaphragms, the gas dissolved in the functional water is dispersed and expanded into fine bubbles to enhance the solubility of the gas in the liquid.

In other embodiments, the contactor is in plurality, and the plurality of contactors are connected in series.

In further embodiments, there is provided a method of supplying a functional water to one or more process units which treat a substrate using the functional water. The method includes: supplying the functional water generated in a functional water generator to a buffer tank prior to supplying the functional water to the process unit; measuring a concentration of a gas dissolved in the functional water of the buffer tank; and when the measured concentration of the gas is within a set concentration range, supplying the functional water to the process unit and when the measured concentration of the gas is not within the set concentration range, returning the functional water in the buffer tank to the functional water generator. The concentration of the gas dissolved in the functional water of the buffer tank may be measured in a circulation line coupled to the buffer tank.

In other embodiments, the functional water generated in the functional water generator is distributed to the process units by the distributor, and the functional water which is not distributed to the process units or remains in the distributor is returned to the functional water generator.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

The present invention will now be described more fully with reference to the accompanying drawings, in which exemplary embodiments of the invention are shown. The invention may, however, be embodied in many different forms and should not be construed as being limited to the embodiments set forth herein; rather, these embodiments are provided so that this disclosure will be thorough and complete, and will fully convey the concept of the invention to those skilled in the art. In the drawings, the shapes of elements are exaggerated for clarity.

Figure 2:
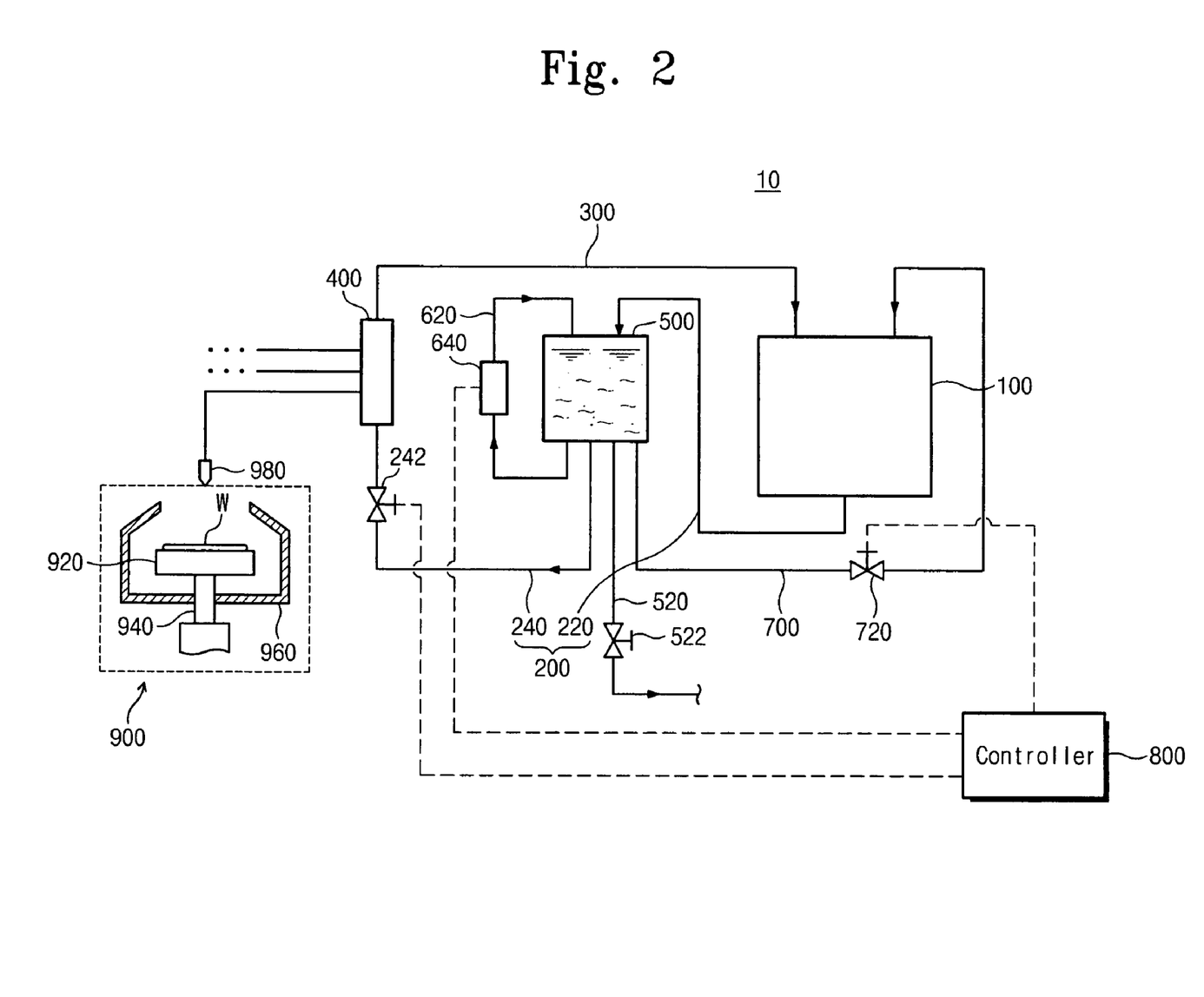
FIG. 2 is a view schematically showing a functional water supply system according to an embodiment of the present invention.

FIG. 2 is a view schematically showing a functional water supply system 10 according to an embodiment of the present invention. Referring to FIG. 2, in the functional water supply system 10, functional water is supplied to one or more process units 900 which perform a process using the functional water. The process unit 900 may be, for example, an apparatus of cleaning a wafer or a substrate used for fabricating a flat display panel. The process unit 900 has a support plate 920 on which a wafer 'W' is mounted, and a support shaft 940 for rotating the support plate 920. The wafer 'W' is mounted on the support plate 920 such that a patterned surface is directed upward. A spray nozzle 980 spraying the functional water onto the wafer 'W' is disposed above the support plate 920. The support plate 940 and the support shaft 940 are enclosed by a container 960.

The functional water supply system 10 includes a functional water generator 100, a functional water supply pipe 200, a functional water recovery pipe 300, a distributor 400, and a buffer tank 500. The functional water generator 100 generates the functional water by dissolving a gas in a deionized water. For example, the gas may be hydrogen ($H_2$), oxygen ($O_2$) or ozone ($O_3$), and the functional water may be hydrogen water, oxygen water or ozone water.

The functional water generated in the functional water generator 100 is supplied to the distributor 400 through the functional water supply pipe 200. The distributor 400 distributes the functional water supplied from the functional water generator 100 to the process unit 900. When the process unit 900 stops or completes a process, the functional water remained after distribution of the functional water is recovered to the functional water generator 100 through the functional water recovery pipe 300. The concentration of a gas dissolved in the functional water generated in the functional water generator 100 (hereinafter referred to as 'functional water concentration') is measured in the buffer tank 500. A functional water circulation pipe 620 is coupled to the buffer tank 500. A constant amount of the functional water in the buffer tank 500 continues to circulate through the functional water circulation pipe 620. A concentration meter 640 for measuring concentration of the functional water is installed in the functional water circulation pipe 620. Signal measured by the concentration meter 640 is transmitted to a controller 800.

When the measured functional water concentration is within a set concentration range, the functional water is supplied from the buffer tank 500 to the distributor 400 through a second supply pipe 240. a valve 242 is installed on the second supply pipe 240 for opening and closing an inner passage or controlling a flow of the functional water flowing therethrough. The valve 242 may be a solenoid valve which is electrically controllable by the controller 800.

A functional water returning pipe 700 is installed between the buffer tank 500 and the functional water generator 100. If the functional water concentration in the buffer tank 500 goes out of a set concentration rage, the functional water in the buffer tank 500 is returned to the functional water generator 100 through the functional water returning pipe 700. A valve 720 for opening and closing an inner passage of the functional water returning pipe 700 is installed on the functional water returning pipe 700. The valve 720 may be a solenoid valve which is electrically controllable by the controller 800. Also, a discharge pipe 520 for discharging the functional water received in the buffer tank 500 to an outside is connected with the buffer tank 500. The discharge pipe 520 may be branched from the functional water returning pipe 700. A valve 522 for opening and closing an inner passage of the discharge pipe 520 is installed on the discharge pipe 520.

Since the functional water concentration is continuously measured in the functional water circulation pipe 620 coupled to the buffer tank 500, it can be more accurately measured compared with that measured at a position adjacent to the functional water generator 100. Accordingly, since the functional water within the set concentration range is supplied to the distributor 400, a process failure in the process unit 900 can be prevented.

In addition, when the functional water concentration goes out of the set concentration range, the functional water returns to the functional water generator 100. Therefore, the system of the present invention can prevent the functional water from being wasted, compared with the related art system which discharge the functional water to an outside until the functional water concentration reaches the set concentration range.

Figure 3:
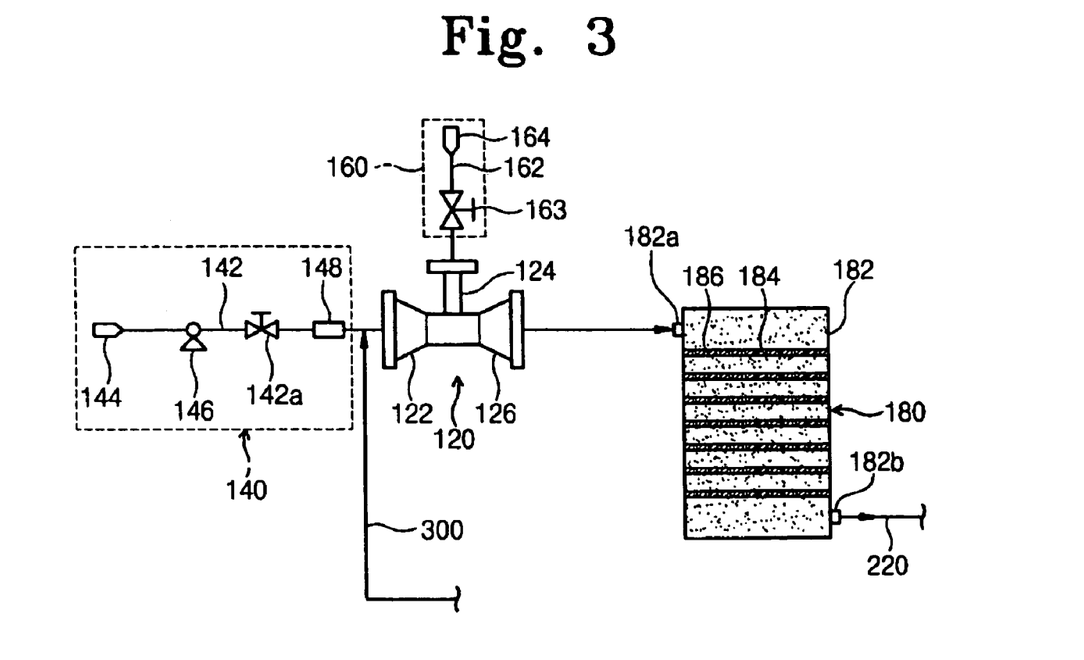
FIG. 3 is a schematic view exemplarily showing the functional water generator of FIG. 2.

FIG. 3 is a schematic view exemplarily showing the functional water generator 100 of FIG. 2. Referring to FIG. 3, the functional water generator 100 includes an injector 120, a liquid supply part 140, a gas supply part 160 and a contactor 180. The injector 120 primarily dissolves a gas in a liquid. The injector 120 includes a liquid input terminal 122, a gas absorbing terminal 124 and a discharge terminal 126. The injector 120 can dissolve the gas in the liquid using a venturi effect. In other words, while a liquid introduced through the liquid input terminal 122 of the injector 120 flows through the injector 120, a gas supplied through the gas absorbing terminal 124 of the injector 120 is inhaled into the liquid by the venturi effect and is then dissolved in the liquid.

The liquid supply part 140 supplies a liquid to the injector 120. The liquid supply part 140 includes a liquid storage part 144 and a liquid supply pipe 142 connecting the liquid storage part 140 with the liquid input terminal 122 of the injector 120. A pump 146 providing a flow pressure to the liquid is installed on the liquid supply pipe 142, and a valve 142a for opening and closing an inner passage of the liquid supply pipe 142 or adjusting a supply amount of deionized water is also installed on the liquid supply pipe 142. Also, if a gas, such as nitrogen, oxygen or the like is already dissolved in the liquid, amount of gas that can be substantially dissolved in the liquid is decreased. To prevent this, a degassing unit 148 for removing a gas, such as nitrogen, oxygen or the like contained in the liquid is installed on the liquid supply pipe 142.

The gas supply part 160 supplies a gas to the injector 120. The gas supply part 160 includes a gas supply pipe 162 connecting a gas storage part 164 with the gas absorbing terminal 124. A valve 163 for opening and closing an inner passage of the gas supply pipe 162 or adjusting a supply flow rate of the gas is also installed on the gas supply pipe 162.

When the functional water intended to generate is hydrogen water, the liquid is deionized water and the gas is hydrogen gas. Also, when the functional water intended to generate is oxygen water, the liquid is deionized water and the gas is oxygen gas.

Figure 4:
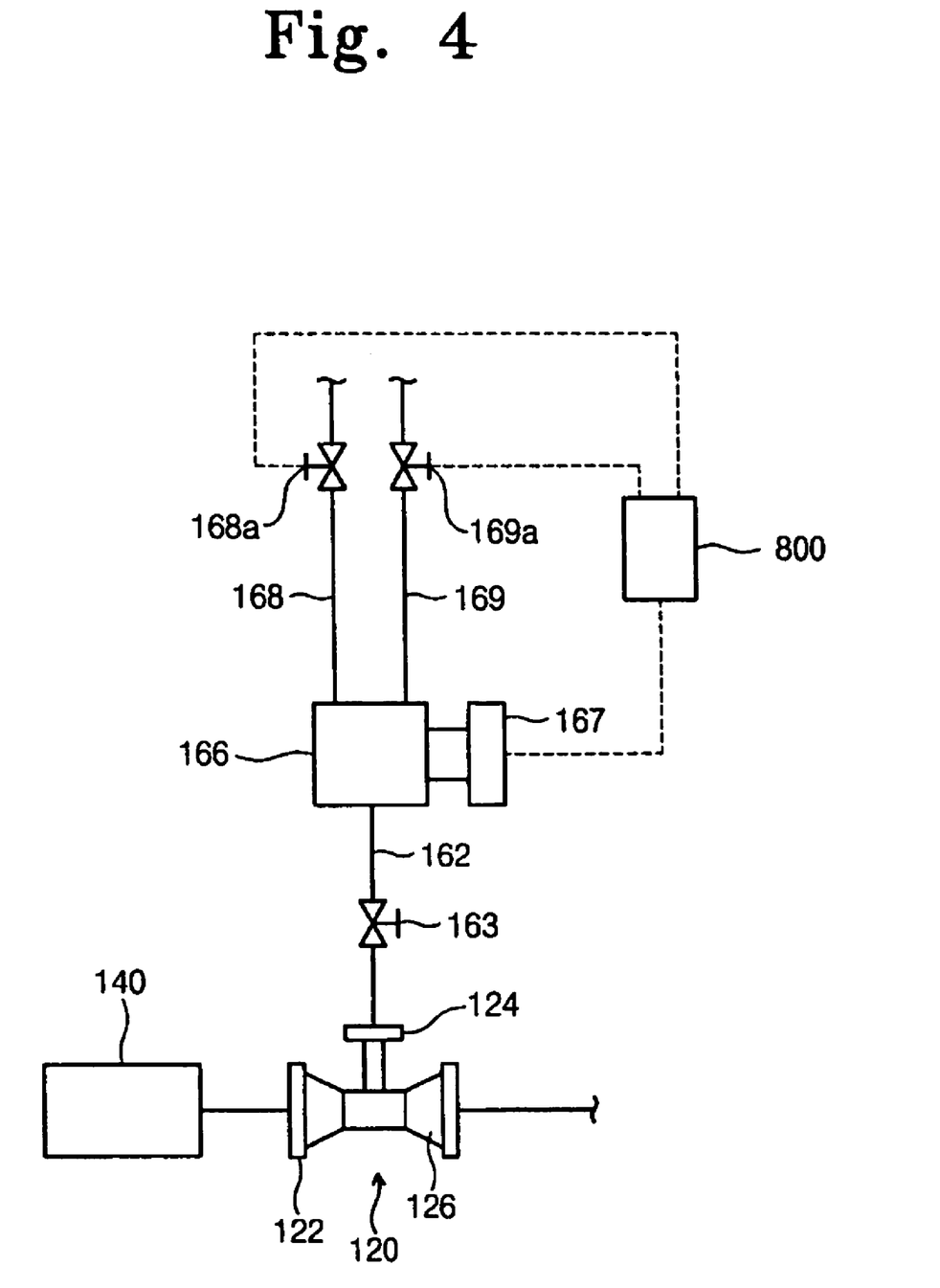
FIG. 4 is a schematic view exemplarily showing supply of ozone gas in the functional water generator of FIG. 3.

FIG. 4 exemplarily shows the gas supply part 160 of FIG. 3 when the functional water intended to generate is ozone water. Referring to FIG. 4, the gas supply part 160 includes the gas supply pipe 162, an ozone generator 166, a power supply unit 167, a first gas supply pipe 168 and a second gas supply pipe 169. The first and second gas supply pipes 168 and 169 are used to supply a gas used for generate ozone to the ozone generator 166. For example, a first gas may be oxygen ($O_2$) gas and a second gas may be carbon dioxide ($CO_2$). Each of the first and second gas supply pipes 168 and 169 has a flow controller 168a, 169a for controlling flow of each of the first and second gases. The flow controllers 168a and 169a may be, for example, a mass flow controller. The power supply unit 167 applies an energy necessary for generating ozone to the ozone generator 166, and is controlled by the controller 800. Also, the controller 800 can control the flow controllers 168a and 169a installed on the first and second gas supply pipes 168 and 169 to adjust the amount of ozone generated in the ozone generator 166. The ozone generated in the ozone generator 166 is dissolved by deionized water in the injector 120, so that ozone water is generated.

Again referring to FIG. 3, the functional water generated in the injector 120 is supplied to the contactor 180. The contactor 180 enhances the solubility of gas in the liquid. The contactor 180 includes a body 182 having an inlet 182a and an outlet 182b. Diaphragms 184 are installed inside the body 182. Each of the diaphragms 184 has a plurality of fine through holes 186. The functional water introduced into the body 182 is dispersed and diffused through the through holes 186 of the diaphragms 184. As the functional water passes through the fine through holes 186 of the contactor 180, the gas is dissolved in the deionized water in a fine bubble state, so that the gas solubility in the deionized water is enhanced. Thereafter, the functional water in the contactor 180 is supplied to the buffer tank 500 through the outlet 182b of the contactor 180.

Figure 5:
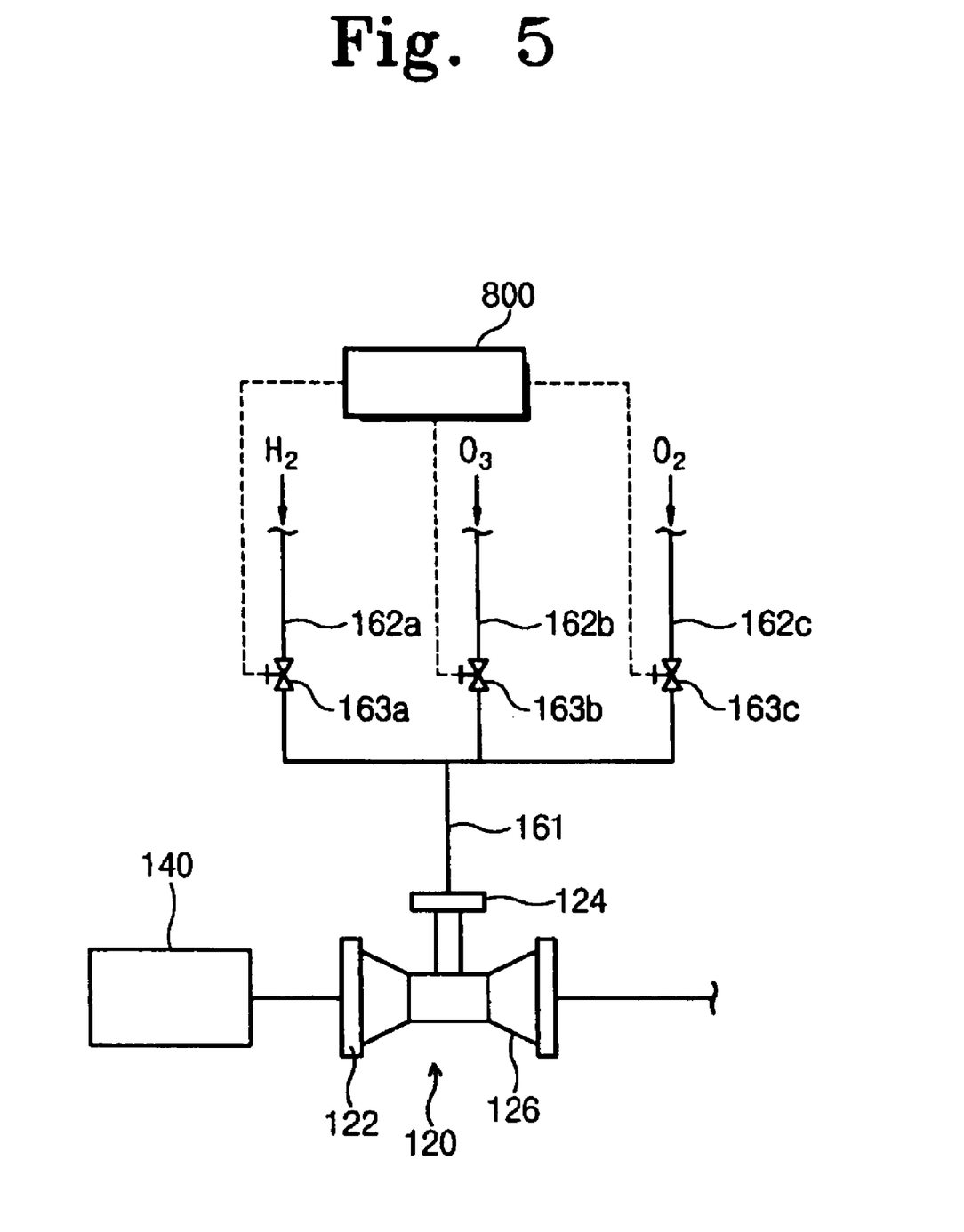
FIG. 5 is a schematic view exemplarily showing supply of two or more gases in the functional water generator of FIG. 3.

FIG. 5 shows a functional water generator according to another embodiment of the present invention. The functional water generator of FIG. 5 has a structure that can generate two or more functional waters, and it can sequentially generate and supply two or more functional waters to a process unit. In FIG. 5, the functional water generator has a structure that can generate first to third functional waters. The first functional water may be hydrogen water, the second functional water may be ozone water, the third functional water may be oxygen water. The hydrogen water is effective in removing a reductive organic material attached on the wafer 'W', and the oxygen water and the ozone water are effective in removing an oxidative organic material or particles attached on the wafer 'W'. At this time, the liquid is a deionized water, and the first gas is hydrogen gas, the second gas is ozone gas, the third gas is oxygen gas.

The gas supply part 160 has a main supply pipe 161 connected with the gas absorbing terminal 124 of the injector 120. A first gas supply pipe 162a, a second gas supply pipe 162b and a third gas supply pipe 162c are respectively connected to the main supply pipe 161. The first gas supply pipe 162a supplies hydrogen gas to the injector 120, the second gas supply pipe 162b supplies ozone gas to the injector 120, and the third gas supply pipe 162c supplies oxygen gas to the injector 120. The first to the third gas supply pipes 162a, 162b and 162c are respectively provided with first to third valves 163a, 163b and 163c for opening and closing their inner passage to control a flow rate of the gases. The first to the third valves 163a, 163b and 163c installed on the first to the third gas supply pipes 162a, 162b and 162c are controlled by the controller 800. The controller 800 selects the gas to be supplied to the injector depending on the type of the functional water to be used in a process. While the above example shows that three kinds of functional waters can be generated, the present invention is not limited thereto. In other words, the number and kinds of the functional waters can be varied variously.

Figure 6:
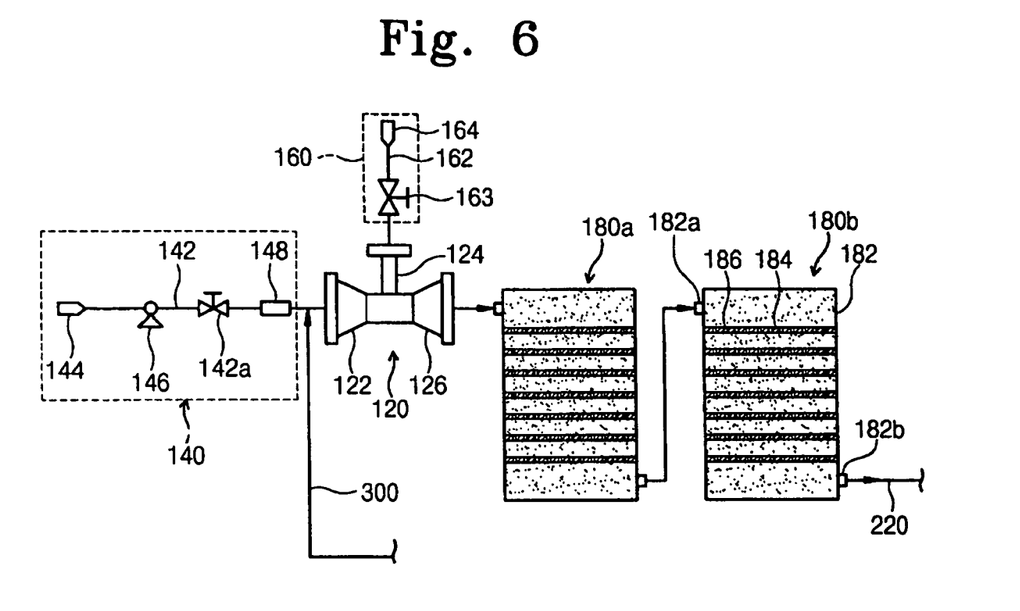
FIG. 6 is a schematic view exemplarily showing another functional water generator according to the present invention.

FIG. 6 shows a functional water generator according to another embodiment of the present invention. Referring to FIG. 6, the functional water generator 100 includes a plurality of contactors 180a and 180b. The contactors 180a and 180b are connected in series to increase the solubility of gas in the deionized water. A variety of methods for dissolving gas in deionized water, which are different than the aforementioned method, may be used.

Figure 7:
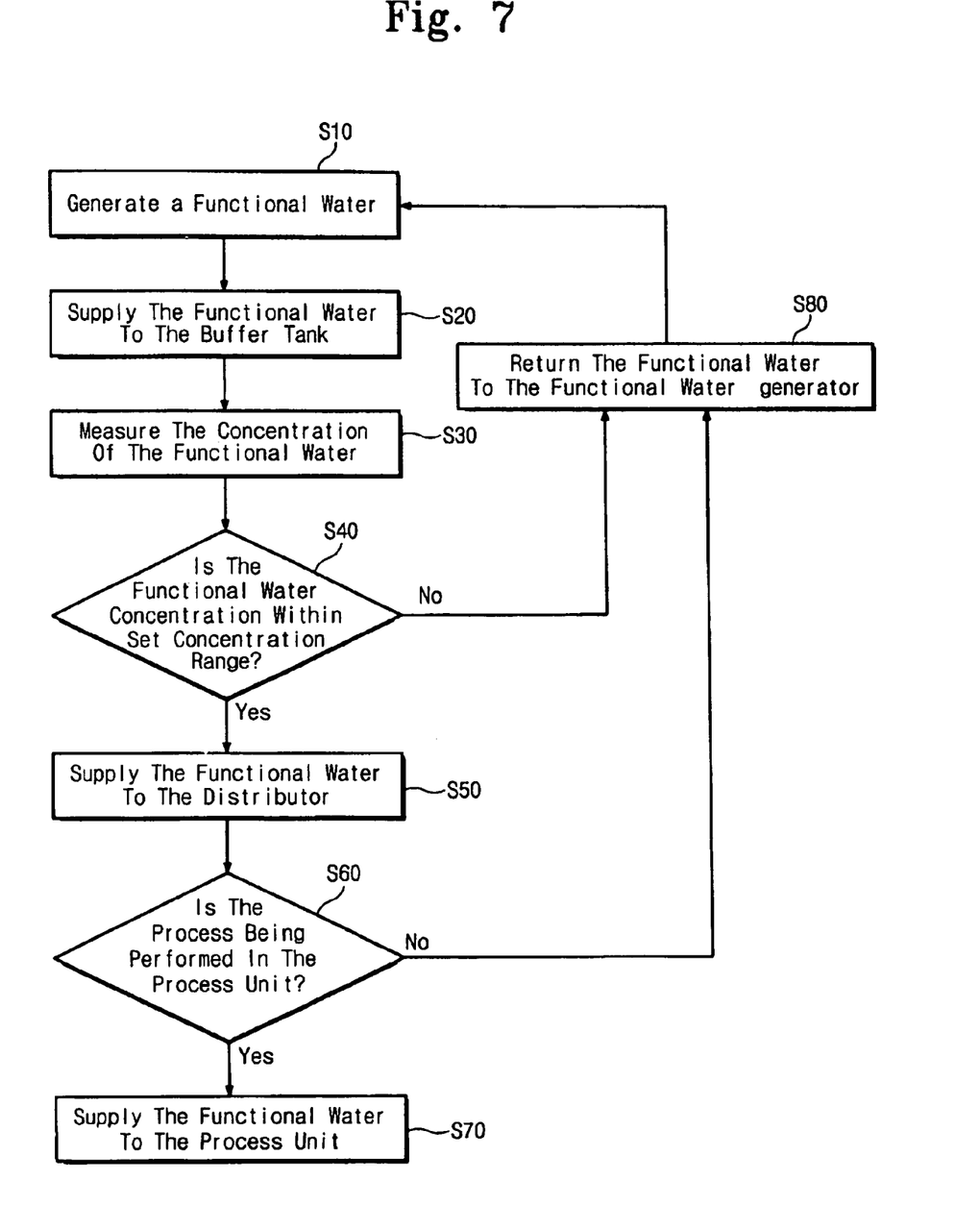
FIG. 7 is a flow diagram showing a method of supplying ozone water according to an embodiment of the present invention.

Next, a method of supplying a functional water to the process unit 900 will be described with reference to FIG. 7. FIG. 7 is a flow diagram showing a method of supplying a functional water to the process unit 900. An example that ozone water is used as the functional water will be now described.

First, ozone water is generated in the ozone water generator 100 (S10). In detail, oxygen gas and carbon dioxide gas are supplied to the ozone generator 166 and an electrical power is applied to the ozone generator 166 to generate ozone. The flow rates of oxygen and carbon dioxide gases and the electrical power applied to the ozone generator 166 are controlled by the controller 800. The generated ozone and deionized water are supplied to the injector 120, and the ozone is dissolved in the deionized water to generate ozone water. The ozone water being discharged from the injector 120 is supplied to the contactor 180, so that the solubility of ozone in the deionized water of the contactor 180 is increased.

Next, the ozone water is supplied to the buffer tank 500 through the first supply pipe 220 (S20). The ozone water supplied to the buffer tank 500 is continuously circulated through the functional water circulation pipe 620, and the concentration of ozone dissolved in the ozone water in the functional water circulation pipe 620 is measured (S30). The measured concentration value is transmitted to the controller 800. The controller 800 checks whether or not the measured ozone concentration is within a set concentration range (S40). When the measured ozone concentration is not within the set concentration range, the ozone water returns to the ozone water generator 100 through the functional water returning pipe 700 (S80). When the measured ozone concentration is within the set concentration range, the ozone water in the buffer tank 500 is supplied to the distributor 400 through the second supply pipe 240 (S50).

Next, it is determined whether a process using the ozone water is performed in the process unit 900 (S60). When a process using the ozone water is performed in the process unit 900, the ozone water is supplied to the process unit through the distributor 400 (S70). When a process using the ozone water is not performed in the process unit 900, the ozone water returns to the ozone water generator 100 through the functional water returning pipe 300 (S80). The ozone water generated in or returned to the ozone water generator 100 is again supplied to the injector 120 along with the deionized water.

As described above, according to the present invention, when the gas concentration dissolved in the functional water is not within the set concentration range, the functional water returns to the functional water generator. That is, since only the functional water within a set concentration rage is supplied to a process unit, cleaning efficiency can be enhanced.

Also, when the gas concentration dissolved in the functional water is not within the set concentration range or a process is not performed in a process unit, the functional water returns to the functional water generator to prevent the functional water from being wasted.

Further, since the concentration of the functional water is measured in the buffer tank, it can have a high accuracy.

Furthermore, it is possible to enhance the solubility of a gas in the functional water.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A system for supplying a functional water to a process unit which treats a substrate using the functional water, the system comprising:
    a functional water generator generating the functional water;
    a functional water supply pipe supplying the functional water generated in the functional water generator to the process unit;
    a buffer tank connected with the functional supply pipe, for storing the functional water generated in the functional water generator;
    a concentration meter measuring the concentration of a gas dissolved in the functional water stored in the buffer tank;
    a functional water returning pipe having one end connected to the buffer tank and the other end connected to the functional water generator, the functional water returning pipe returning the functional water in the buffer tank to the functional water generator when the concentration of the gas dissolved in the functional water received stored in the buffer tank is out of a set concentration range;
    a distributor for distributing the functional water supplied from the functional water supply pipe to the process unit;
    and a functional water recovery pipe having one end connected to the distributor and the other end connected the functional water generator, the functional water recovery pipe recovering the functional water which is not distributed to the process unit to the functional water generator; wherein the functional water supply pipe includes:
        a first supply pipe having one end connected to the functional water generator and the other end connected to the buffer tank, the first supply pipe supplying the functional water generated in the functional water generator to the buffer;
        a second supply pipe having one end connected to the buffer tank and the other end connected to the distributor, the second supply pipe supplying the functional water stored in the buffer tank to the distributor; and
        a third supply pipe having one end connected to the distributor and the other end connected to the process unit, the third supply pipe supplying the functional water supplied to the distributor to the process unit.

2. The system of claim 1, further comprising a circulation pipe circulating the functional water in the buffer tank, wherein the concentration meter is installed on the circulation pipe.

3. The system of claim 1, wherein the functional water comprises at least one selected from the group consisting of ozone water, oxygen water and hydrogen water.

4. The system of claim 1, wherein the functional water generator comprises:
    a liquid supply part;
    a gas supply part;
    an injector for dissolving a gas in a liquid, the liquid is supplied from the liquid supply part and the gas is supplied from the supply part; and
    a contactor for enhancing the solubility of the gas in the liquid after receiving the functional water discharged from the injector.

5. The system of claim 4, wherein the gas supply part comprises a plurality of gas supply pipes connected with the injector so as to supply different kinds of gases to the injector, a valve is installed on each of the plurality of gas supply pipes,
    wherein the functional water supply system further comprises a controller for controlling the valve installed on each of the plurality of gas supply pipes such that a selected gas is supplied to the injector.

6. The system of claim 4, wherein the injector is designed in a shape that allows the gas to be dissolved in the liquid by a venturi effect.

7. The system of claim 6, wherein the contactor comprises:
    a body having an inlet and an outlet; and
    a plurality of diaphragms installed in the body and having a plurality of fine through holes,
    whereby while the functional water is dispersed and moved through the through holes of the diaphragms, the gas dissolved in the functional water is dispersed and expanded into fine bubbles to enhance the solubility of the gas in the liquid.

8. The system of claim 7, wherein the contactor is in plurality, and the plurality of contactors are connected in series.

9. A method for supplying a functional water to the process unit in the system of claim 1, the method comprising:
storing the functional water supplied from the functional water generator through the first supply pipe in the buffer tank;
measuring a concentration of a gas dissolved in the functional water of the buffer tank;
when the measured concentration of the gas is within a set concentration range, supplying the functional water to the process unit through the functional water supply pipe and when the measured concentration of the gas is not within the set concentration range, returning the functional water in the buffer tank to the functional water generator through the functional water returning pipe.

10. The method of claim 9, wherein the functional water generated in the functional water generator is distributed to the process unit by the distributor, and the functional water which is not distributed to the process unit or remains in the distributor is returned to the functional water generator.

11. The method of claim 9, wherein the concentration of the gas dissolved in the functional water of the buffer tank is measured in a circulation line coupled to the buffer tank.

12. A system for supplying a functional water to a process unit which treats a substrate using the functional water, the system comprising:
a functional water generator generating the functional water;
a first functional water supply pipe;
a buffer tank connected with the first functional supply pipe, for storing the functional water generated in the functional water generator;
a concentration meter measuring the concentration of a gas dissolved in the functional water received in the buffer tank;
a functional water returning pipe returning the functional water in the buffer tank to the functional water generator when the concentration of the gas dissolved in the functional water received in the buffer tank is out of a set concentration range;
a functional water recovery pipe recovering the functional water, which is not distributed to the process unit, to the functional water generator; and
a second functional water supply pipe supplying the functional water generated in the functional water generator to the process unit.

13. The system of claim 12, further comprising:
a distributor for distributing the functional water supplied from the second functional water supply pipe to the process unit.

14. The system of claim 12, further comprising a circulation pipe circulating the functional water in the buffer tank, wherein the concentration meter is installed on the circulation pipe.

15. The system of claim 12, wherein the functional water comprises at least one selected from the group consisting of ozone water, oxygen water and hydrogen water.

16. The system of claim 12, wherein the functional water generator comprises:
a liquid supply part;
a gas supply part;
an injector for dissolving a gas in a liquid, the liquid is supplied from the liquid supply part and the gas is supplied from the supply part; and
a contactor for enhancing the solubility of the gas in the liquid after receiving the functional water discharged from the injector.

17. The system of claim 16, wherein the gas supply part comprises a plurality of gas supply pipes connected with the injector so as to supply different kinds of gases to the injector, a valve is installed on each of the plurality of gas supply pipes,
wherein the functional water supply system further comprises a controller for controlling the valve installed on each of the plurality of gas supply pipes such that a selected gas is supplied to the injector.

18. The system of claim 16, wherein the injector is designed in a shape that allows the gas to be dissolved in the liquid by a venturi effect.

* * * * *